(12) United States Patent
Nyhavn et al.

(10) Patent No.: US 10,697,291 B2
(45) Date of Patent: Jun. 30, 2020

(54) REAL-TIME FLUID MONITORING SYSTEM AND METHOD

(71) Applicant: WELLSTARTER AS, Trondheim (NO)

(72) Inventors: Fridtjof Nyhavn, Trondheim (NO); Erik Iversen Nakken, Hommelvik (NO); Jean-Christophe Barbier, Andalsnes (NO)

(73) Assignee: Wellstarter AS, Trondheim (NO)

( * ) Notice: Subject to any disclaimer, the term of this patent is extended or adjusted under 35 U.S.C. 154(b) by 0 days.

(21) Appl. No.: 15/999,091

(22) PCT Filed: Feb. 15, 2017

(86) PCT No.: PCT/NO2017/050039
§ 371 (c)(1),
(2) Date: Aug. 16, 2018

(87) PCT Pub. No.: WO2017/131530
PCT Pub. Date: Aug. 3, 2017

(65) Prior Publication Data
US 2019/0093475 A1 Mar. 28, 2019

(30) Foreign Application Priority Data

Feb. 16, 2016 (NO) .................................. 20160274

(51) Int. Cl.
*E21B 47/10* (2012.01)
*E21B 47/06* (2012.01)
(Continued)

(52) U.S. Cl.
CPC ........ *E21B 47/1005* (2013.01); *E21B 36/001* (2013.01); *E21B 36/008* (2013.01);
(Continued)

(58) Field of Classification Search
CPC .... E21B 21/08; E21B 2021/006; E21B 44/00; E21B 47/065; E21B 47/1005; E21B 47/06; E21B 49/00; E21B 49/087
See application file for complete search history.

(56) References Cited

U.S. PATENT DOCUMENTS 4,237,730 A 12/1980 Feng
5,226,333 A 7/1993 Hess
(Continued)

FOREIGN PATENT DOCUMENTS

SU 804825 A1 2/1981
WO 2010123566 A1 10/2010
(Continued)

OTHER PUBLICATIONS

International Search Report and the Written Opinion for International Application No. PCT/NO2017/050039, dated May 16, 2017, 11 pages.

*Primary Examiner* — Zakiya W Bates
(74) *Attorney, Agent, or Firm* — Chamberlain Hrdlicka

(57) ABSTRACT

A method and system of monitoring fluid flow in a wellbore. One or more space-distributed temperature input pulses are induced into at least a portion of a fluid in a housing in the wellbore. The housing has at least one cavity and one or more flow ports. A temperature response pulse, caused by the temperature input pulses, are sensed at one or more locations downstream of the cavity and a flow rate of the fluid through the cavity is determined. The flow rate may be determined based on one or more characteristics of the temperature response pulse, and a Retention Time Distribution (RTD) of the cavity.

32 Claims, 11 Drawing Sheets

(51) Int. Cl.

| | |
|---|---|
| *E21B 21/08* | (2006.01) |
| *E21B 44/00* | (2006.01) |
| *G01F 1/708* | (2006.01) |
| *G01F 1/74* | (2006.01) |
| *E21B 36/00* | (2006.01) |
| *E21B 36/04* | (2006.01) |

(52) U.S. Cl.
CPC .............. *E21B 36/04* (2013.01); *E21B 47/06* (2013.01); *E21B 47/065* (2013.01); *E21B 47/1015* (2013.01); *G01F 1/7084* (2013.01); *G01F 1/74* (2013.01)

(56) References Cited

U.S. PATENT DOCUMENTS

| | | |
|---|---|---|
| 2003/0140711 A1 | 7/2003 | Brown |
| 2007/0234788 A1 | 10/2007 | Glasbergen et al. |
| 2008/0023196 A1 | 1/2008 | Crawley et al. |
| 2010/0082258 A1 | 4/2010 | Wang et al. |
| 2013/0000398 A1 | 1/2013 | DiFoggio |
| 2014/0343908 A1 | 11/2014 | Nyhavn |
| 2015/0027715 A1* | 1/2015 | Tinnen .................... E21B 47/18 166/316 |

FOREIGN PATENT DOCUMENTS

| | | |
|---|---|---|
| WO | 2015030596 A1 | 3/2015 |
| WO | 2015102619 A1 | 7/2015 |
| WO | 2015153549 A1 | 10/2015 |
| WO | 2017003297 A1 | 1/2017 |

* cited by examiner

REAL-TIME FLUID MONITORING SYSTEM AND METHOD

FIELD OF THE INVENTION

The invention concerns the field of monitoring fluids in zones of a wellbore. More specifically, the invention concerns a system and a method for real-time monitoring of fluid parameters, as set out in the preamble of claims 1 and 21.

BACKGROUND OF THE INVENTION

Hydrocarbon fluids such as oil and natural gas are obtained from subterranean geologic formations, referred to as reservoirs, by drilling one or more wells that penetrate the hydrocarbon-bearing formation. Once a wellbore has been drilled, the well is completed to and hydrocarbons may be produced from the well. A completion involves the design, selection, and installation of equipment and materials in or around the wellbore for conveying, pumping, or controlling the production or injection of fluids.

Hydrocarbon wells for the exploitation of oil and/or gas from a reservoir normally consist of an upper and outer conductor, which forms the base of the well, an upper casing arranged into and in extension of the conductor, and further down in the well more casings which are arranged into and overlaps the above casing. A production tubing string (often referred to a production liner) is normally the innermost tubing of the well for transporting petroleum from the bottom of the well to the earth s surface or to the sea floor. The part of the casing arrangement that is set across the production zone is normally referred to as a "lower completion string", a string that does not run all the way to the surface. Rather, it is hung from some location above the production zone. It is designed according to the conditions of the productive zone (the reservoir). Lower completion strings may be referred as: horizontal open hole completion, open hole sand control, slotted liner, predrilled liner, etc, and comprise the above mentioned production tubing string or production liner, as well as wellbore casings.

During production, there is a need to monitor the production inflow profile along the production zone. Production inflow profile is defined as the distributed inflow contributions along the production zone, and several monitoring systems and methods are known in the art. One traditional monitoring technique for obtaining such information is the wireline based Production Logging Tool (PLT).

The prior art also includes US 2007/0234788 A1, which describes a method of tracking fluid displacement along a wellbore using real-time temperature measurements. An optical conductor is installed in a wellbore casing and is configured to produce a temperature profile of the fluid flowing along the wellbore. One or more heat sources produce a temperature gradient in at least one fluid composition, and this temperature gradient is monitored along the wellbore by the optical conductor, to track fluid displacement along the wellbore. Due to the substantially different physical properties and rates of heat transfer between the adjacent fluid compositions and the wellbore, a variation in temperature gradient occurs in the wellbore as the interface between the fluid compositions displaces through the wellbore. By observing, in real-time, the position and displacement of the temperature gradient change, the corresponding position, displacement and flow rate of the fluid and its fluid compositions may be determined.

The prior art also includes US 2003/0140711 A1, which describes an apparatus comprising a temperature sensor for measuring and providing indication of the temperature of the fluid at least first and second temperature measuring points spaced by a known distance along the conduit; a heat exchanger selectably operable to alter the temperature of the fluid upstream from said temperature measuring points; and a timer, responsive to said output of said temperature sensor to measure the time difference of arrival of the temperature altered fluid at said first and second temperature measuring points. The conduit has a plurality of flow sources, and the apparatus comprises: a plurality of heat exchangers, each heat exchanger being downstream from a respective flow source; the temperature sensor being operative to measure and indicate the temperature at respective first and second points downstream from each heat exchanger; and the timer being operative to measure the time difference of arrival of temperature altered fluid at each respective pair of the first and second temperature measuring points. Thus, this publication describes an apparatus and a method which utilizes "time-of-flight" measurements for determining inflow profiles.

The prior art also includes U.S. Pat. No. 5,226,333 A, US 2013/0000398 A1, and SU 804825 A1, which also describe devices and methods of time-of-flight measurements for determining inflow profiles. In general, time-of-flight systems utilize heat sources that may be located anywhere upstream, and corresponding downstream temperature sensors. Cables are run along completion to cover multiple sensor positions along the production zone.

The prior art also includes US 2014/0343908 A1, which describes a method of estimating influx volumes of fluids to a production flow in a well. Tracer sources with unique tracer materials are arranged in fluid communication with two or more of the influx zones, and each tracer material has a predefined short duration release dose. Samples of the production flow are collected at the topside, and the samples are analyzed for identifying types of tracer material and concentration of the identified to tracer materials. The calculated influx volumes are utilized as parameters for controlling the production flow or for characterizing the reservoir.

It is a need for an improved system and method for monitoring the inflow profile along a wellbore production zone.

SUMMARY OF THE INVENTION

The invention is set forth and characterized in the main claims, while the dependent claims describe other characteristics of the invention.

It is thus provided a method of monitoring fluid flow in a wellbore, characterized by
  inducing one or more space-distributed temperature input pulses in at least a portion of the fluid in a housing in the wellbore and having at least one cavity and one or more flow ports;
  sensing a temperature response pulse caused by said temperature input pulses, at one or more locations downstream of said cavity; and
  determining a flow rate of said fluid through said cavity.

In one embodiment, the flow rate is determined based on one or more characteristics of said temperature response pulse, and the Retention Time Distribution of said cavity. Said characteristics may be one or more of amplitude, decay, width, and area under a curve (temperature vs. time) defined by the temperature response pulse.

A temperature input pulse may comprise a heat input or a cooling input. A heat input may comprise an exothermic process and the cooling input may comprise an endothermic process.

In one embodiment, a temperature input pulse comprises the injection of a chemical substance into the fluid. A temperature input pulse may comprise a tracer material.

In one embodiment, a temperature input pulse is configured to contribute to a phase change in the fluid. A temperature input pulse may also be is configured to mitigate volume expansion in the fluid.

In one embodiment, a temperature input pulse is controlled by a downhole pre-programmed timer device or by pressure signaling from an uphole location, or by signaling or mechanical activation from an intervention string.

The downhole electronics in the temperature pulse generator is in one embodiment configured to sense the presence of fluid phases (water, oil and gas) and to modulate the information onto the temperature pulse shape. The information on phase presence may be extracted from the signal of the downstream temperature sensor(s) and optionally other sensor(s) on fluid phase information-carrying parameters (e.g. pressure).

In one embodiment, the cavity is defined by a housing having at least an inflow opening and an outflow opening. At least a first opening is in one embodiment between the cavity and a subterranean formation, and at least a second opening is between the cavity and the interior of a lower completion tubular extending in the wellbore. In one embodiment, the tubular is a production liner.

The temperature input pulse may be a heat input, at least a portion of which is conveyed to a tracer member and causing a tracer pulse (i.e. slug) to be released. Subsequent collection and sampling of at least a portion of produced liquids at a location downstream of the location of said temperature input, to determine tracer content in said samples, is a part of an embodiment of the invented method.

In one embodiment, the method further comprises the inline and real-time sensing of tracer content in at least a portion of produced liquids at a location downstream of the location of said temperature input pulse. The flow rate may be determined based on one or more characteristics of said tracer pulse, and the Retention Time Distribution (RTD) of said cavity. The characteristics of said tracer pulse are one or more of amplitude, decay, width, and area under a curve (temperature vs. time) defined by the tracer pulse.

It is also provided a system for monitoring fluid flow in a wellbore, characterized by
one or more temperature pulse generators arranged in a cavity in a housing having a fluid inlet and a fluid outlet in fluid connection with the cavity;
the housing being arranged in the wellbore;
said one or more pulse generators being configured to induce one or more space-distributed temperature input pulses to the fluid; and
one or more sensors arranged at a location downstream of said cavity; said sensor being configured to sense at least a temperature response pulse caused by said temperature input pulses.

In one embodiment, the system comprises computing means configured to determine a flow rate of said fluid based on one or more characteristics of said temperature response pulse, and the Retention Time Distribution of said cavity.

In one embodiment, the temperature pulse generators comprise at least a first temperature pulse generator and a second temperature pulse generator, arranged with a distance apart.

In one embodiment, the temperature pulse generators comprise at least a single temperature pulse generator having a length dimension.

A temperature pulse generator may comprise a heater element or a cooling element. In one embodiment, a temperature pulse generator comprises a chemical substance or an electrical heater. In one embodiment, a temperature pulse generator is powered and controlled via control lines from an uphole location. In one embodiment, a temperature pulse generator is powered and controlled by a downhole power and control module.

A temperature pulse generator may also be powered and controlled by signaling or mechanical activation from an intervention string.

In one embodiment, said sensor comprises real-time downstream sensors for other parameters (such as salinity).

In one embodiment, the cavity is defined by the housing inner wall and a portion of the outer wall of a lower completion tubular extending in the wellbore.

In one embodiment, the sensor is arranged in said tubular, in fluid communication with the fluid. The tubular may be a production liner or a casing.

In one embodiment, the housing is configured for installation inside a lower completion tubular and comprises an annular bore, and inflow and outflow ports in fluid communication with the bore.

While the prior art is based on the exploitation of how temperature in fluid compositions develop along the wellbore as fluids are flowing, the invention comprises a system and methods for inducing a certain temperature change (i.e. heating or cooling) in a volume at a location in the wellbore where retention times are: (i) preferably long compared to retention times elsewhere in the flow system and (ii) dependent of the flow rate passing through a cavity having a given volume.

The ensuing temperature change in the fluid may be sensed at any position(s) downstream of where the temperature change was induced. In one embodiment, the temperature change is sensed at a pre-installed Permanent Downhole Gauge (PDG), a device which is commonly installed in the lower part of the upper completion of most wells. The invention may provide real-time temperature data as often as every second. Using a PDG as the temperature sensor is advantageous as it is already installed, and will thus not represent any additional cost for the operator.

While the prior art relies on the tracing of a single-point-source temperature gradient distribution downstream along the well, by taking temperature measurements at several downstream locations, the invention comprises the measurement of a distributed-source (time or space) temperature wave with essentially a single-point downstream temperature sensor. The invention is not dependent on a cable or an optical fibre (conductor) or any other sensor array extending the length of the production zone, as in the prior art, but may utilize sensor equipment already installed in the wellbore.

BRIEF DESCRIPTION OF THE DRAWINGS

These and other characteristics of the invention will become clear from the following description of an embodiment, given as a non-restrictive example, with reference to the attached schematic drawings, wherein:

FIG. 6a is a schematic illustration of another embodiment of the invention, and

FIG. 6b is a cross-section along the section line A-A in FIG. 6a;

DETAILED DESCRIPTION OF AN EMBODIMENT

Figure 1:
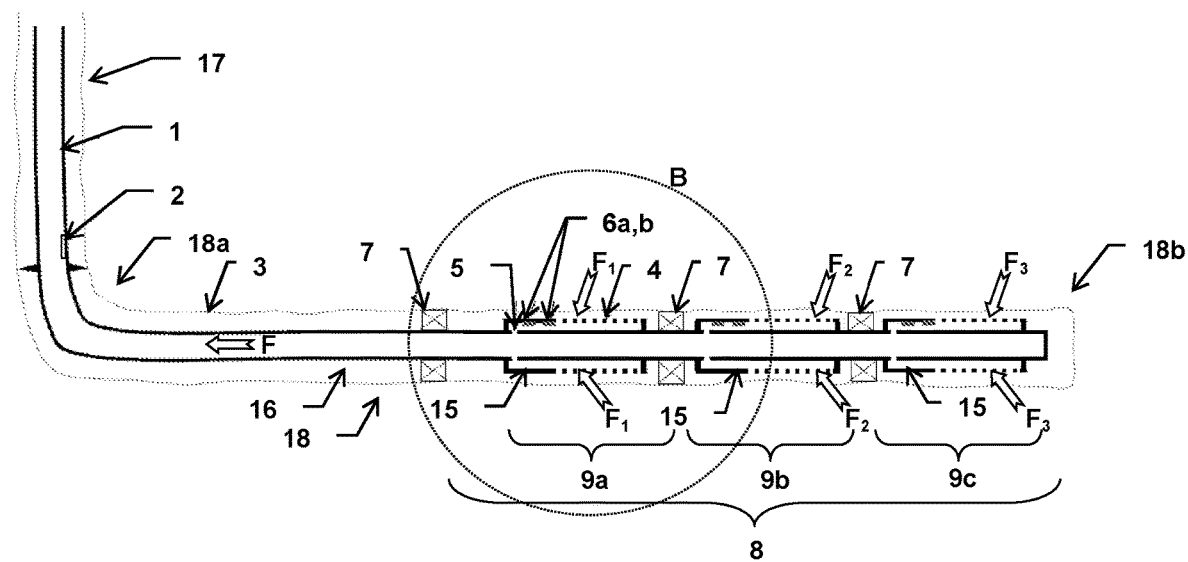
FIG. 1 is a schematic illustration of an embodiment of the invention, installed in a subterranean wellbore and comprising multiple spatially distributed temperature inputs for multi-zone measurements.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

FIG. 1 illustrates a production liner 1 installed in a subterranean wellbore 16 having a wall 3 against a formation (not shown as such) surrounding the wellbore. The figure illustrates a wellbore having a vertical portion 17 (e.g. an upper completion), extending upwards to uphole control and processing facilities (not shown), and a horizontal section 18 having a "heel" 18a and a "toe" 18b. The invention shall not, however, be limited to wellbores having this configuration, but is applicable to wellbores of any orientation and inclination. Also, required lines and means to provide power, control and other signals between the downhole equipment and an uphole location are not shown, as these per se are well known in the art. Although the invention in the following will be described with reference to a production liner, it should be understood that the invention is equally applicable for use in or in relation to a wellbore casing, or any lower completion string installed in the wellbore for the purpose of producing hydrocarbons from the surrounding formation.

A portion of the wellbore 16 extends through a reservoir 8. The reservoir extends through several production zones 9a-c, each of which may have varying contribution characteristics. Each production zone produces fluid inflows $F_1$, $F_2$, $F_3$ of varying flow rates and compositions. In FIG. 1, the production zones 9a-c are shown as being separated by packers 7; however, these are optional. It should also be understood that, although not illustrated, the production zones may be in different branches in the wellbore, and not necessarily arranged one after another.

Figure 2:
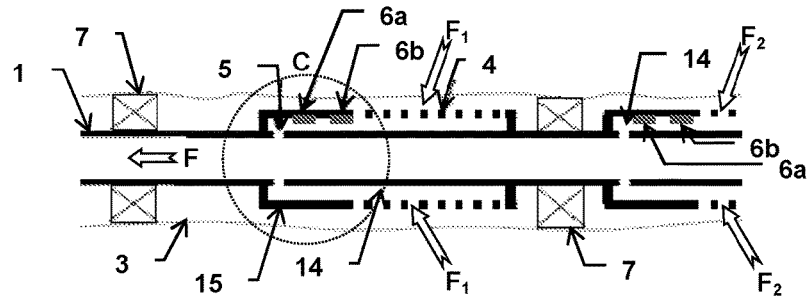
FIG. 2 is an enlarged view of the area marked "B" in FIG. 1.

Referring additionally to FIG. 2, in each production zone 9a-c the production liner 1 comprises an external housing 15 defining a cavity 14 between the housing inner wall and the production liner outer wall. In a practical embodiment, this cavity 14 may thus form an annulus around the production liner 1, but the housing and cavity may have other shapes. A sand screen 4, forming a plurality of openings in the housing, allows fluid flow (i.e. produced fluids) $F_1$, $F_2$ from the surrounding formation and into the respective cavity 14. Perforations 5 in the production liner 1 wall allow the fluid to flow into the liner interior, and further towards the well heel 18a and towards uphole facilities, as indicated by the arrow F in FIGS. 1 and 2.

Figure 3:
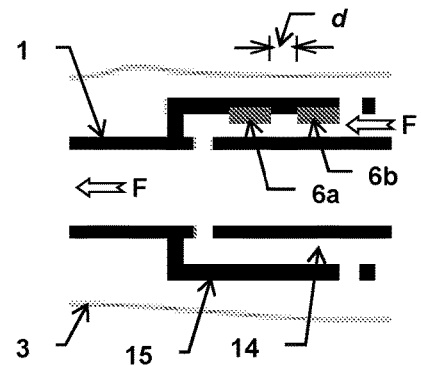
FIG. 3 is an enlarged view of the area marked "C" in FIG. 2.
Figure 4:
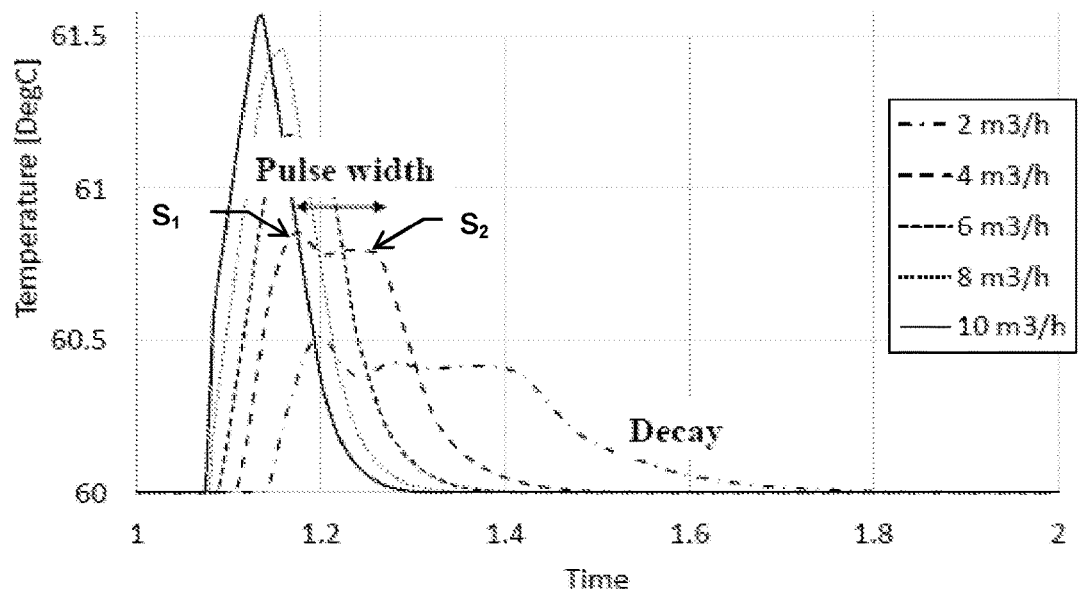
FIG. 4 is a plot of temperature response signals (temperature vs. time) as sensed at a downstream sensor, for different fluid flow rates through the cavity in which a temperature pulse was induced.

Arranged inside the cavity 14 are two temperature pulse generators 6a,b that are configured to induce temperature input pulses into the fluid flowing through the cavity. The temperature input pulse may be adding heat to the fluid, or may be removing heat from the fluid (i.e. cooling it), in manners that are described below. A temperature pulse generator may thus be a cooling element or a heating element. The temperature pulse 30o generators may be remotely controlled and powered, or may be pre-programmed to generate the temperature input at predetermined moments or intervals. Referring additionally to FIG. 3, in the illustrated embodiment, a first temperature pulse generator 6a is arranged at a distance d from a second temperature pulse generator 6b. The temperature pulse generators are configured to induce individual temperature input pulses (heating or cooling) in the fluid F flowing through the cavity 14, whether the fluids are injected fluids or fluids produced from the surrounding formation. Two spatially separated (by a distance d) temperature input pulses may thus be induced in the fluid, one by each temperature pulse generator 6a,b, generating a space-distributed temperature wave. The temperature wave is discussed below, with reference to i.a. FIG. 4.

It should be understood that the two (or more) temperature input pulses in a given production zone are preferably induced (triggered) simultaneously. Asynchronous triggering within a zone is conceivable, but will require additional software in order to factor the time difference into the ensuing computations. However, the asynchronous triggering will enable the option of modulating fluid phase information on to the temperature pulse. The temperature pulse generators in one production zone are thus synchronized with each other, but the temperature pulse generators in each production zone 9a-c are excited in a sequence to avoid ambiguities in the subsequent downstream measurements of the respective temperature waves.

It should be understood that the volume of the cavity 14, $V_c$, is predetermined and is used in the calibration of a retention time flow loop model. For a given flow rate (q) through the volume $V_c$, the temperature decay may be expressed as:

$$T(t) = T_0 + k_1 \cdot e^{\frac{-k_2 \cdot q}{V_c t}}$$

where $T_0$ is the initial temperature and $k_1$ and $k_2$ are empirical constants.

Also, ideally, each of the cavities 14 (in the various production zones 9a-c) has the same volume, but this is not a requirement: the subsequent simulations based on the sensed temperature wave may utilize the relative differences in the temperature wave produced in the different cavities.

Arranged a distance downstream of the housings 15 is a sensor 2 (see FIG. 1), placed such that it is in fluid communication with the flow F inside the production liner 1. The sensor 2 may be any suitable sensor known in the art configured to sense such parameters as fluid pressure, temperature, radioactivity, salinity, etc. The invention thus provides for a measurement of a distributed-source (time or space) temperature wave with only a single-point downstream temperature sensor. In principle, a time-distributed source is a (e.g. a singular) temperature source which emits two or more pulses at known intervals; this will yield a space-distributed temperature response pulse in the flowing fluid. A space-distributed source is a temperature source having a length dimension, or two or more sources that emit pulses; both yielding a space-distributed temperature response pulse in the flowing fluid.

For example, a temperature (e.g. heat) input into the fluid is spatially distributed, forming a pulse (slug) of warmer liquids. A spatially distributed heat source that instantly releases heat is an idealized configuration.

Therefore, the term "distributed source" may be understood to mean multiple temperature pulse generators, separated by a distance (d) in the axial direction of the production tubular (i.e. along the flow path for the produced flow), or a temperature pulse generator having a length dimension (l).

In the illustrated embodiment, the sensor 2 is a so-called Permanent Downhole Gauge (PDG; necessary power, control and signal lines to an uphole location are not illustrated). The invention shall not be limited to this type of sensor, however, and also not to the number of sensors. In principle, the temperature wave may be sensed at any position(s) downstream of where the temperature change was induced. An important distinction between the invention and the prior art, however, is that while the prior art (e.g. time-of-flight) requires several sensors arranged downstream of the temperature input, the invention needs only one (a singular) downstream sensor.

By an appropriate design and dimensioning of such parameters as the cavity 14 volume $V_c$ and perforation 5, the flow retention time inside the cavity 14, and thus the flow rate through the cavity, may be optimized to suit characteristics of the temperature pulse generator(s). Advantageously, the design and dimensioning is preferably such that the flow retention times in the cavity are long compared to retention times elsewhere in the flow system (e.g. in the production liner), and such that the flow retention time is dependent of the flow rate through the cavity.

When the two (or more) temperature input pulses are induced into the flow by the temperature pulse generators 6a,b, a temperature wave (or temperature response pulse) is formed, having a characteristic Retention Time Distribution (RTD) that modulates the shape of the wave in the liner 1. With the appropriate design, the RTD will depend mainly on the fluid flow rate (q) through the volume $V_c$, of the cavity 14.

FIG. 4 is a plot of heat waves (temperature vs. time) for different flow rates for fluid flowing through a cavity 14, as measured by the sensor 2 and processed by suitable flow simulator software. One example of such software is the well-known OLGA dynamic flow simulator. Information about the fluid flow (e.g. flow rate) may be determined based on the pulse (wave) shape, and calculated or estimated by the RTD: pulse width, pulse decay (pulse shape modulation), pulse amplitude (amplitude modulation), or the area under the temperature response curve. Such calculation methods and tools are well known in the art, and need therefore not be described in detail here. FIG. 4 shows that the pulse amplitude is proportional with flow rate, and that the pulse width and decay both are inversely proportional with flow rate. The plots also show that the distance between the peaks (caused by the two distinct temperature input pulses induced by the simultaneously triggered, but spatially separated, respective temperature pulse generators) decrease with increasing flow rate. For example, $S_1$ and $S_2$ indicate the respective peaks for the 4 m³/h flow rate.

Figure 5:
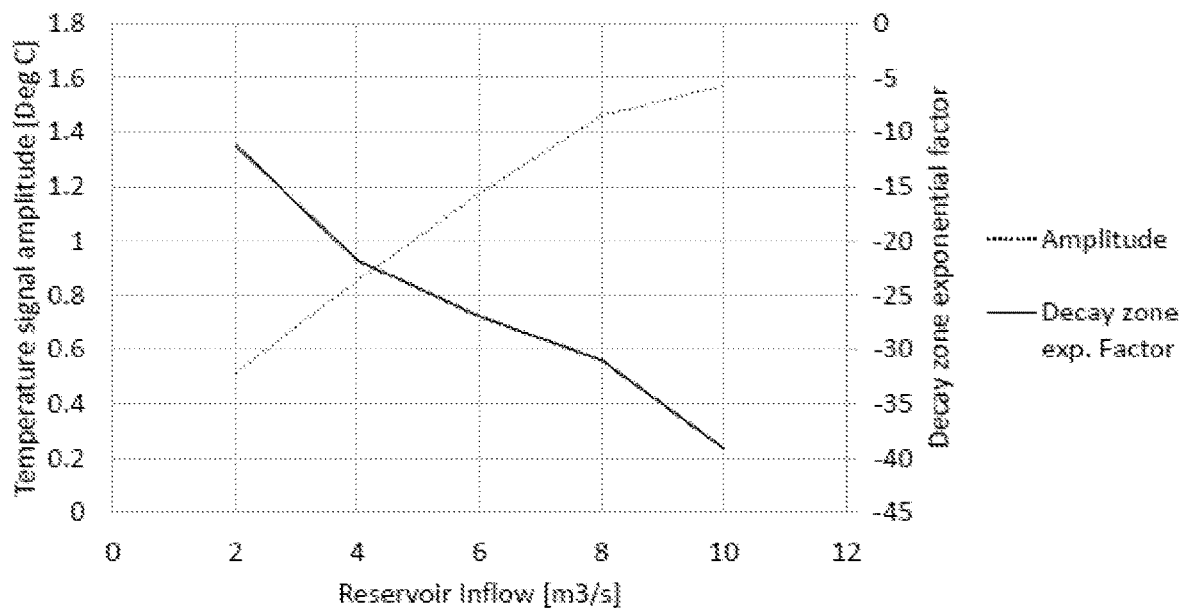
FIG. 5 is a signal analysis plot, illustrating the linear relationship between temperature response signal amplitude and fluid flow rate, and between exponential temperature response decay factor and fluid flow rate.

FIG. 5 shows that the pulse amplitude and decay zone exponential factor exhibit almost linear relationships with respect to fluid flow rate, with deviations only in the range of 5 to 10%.

It should also be understood that, although not illustrated, the temperature pulse generators may be placed in different branches in the wellbore, and not necessarily arranged one after another in a single bore, as described above. Hence, housings (with associated respective cavities and temperature pulse generators) may be placed in the bores of multi-lateral wells.

Figure 6:
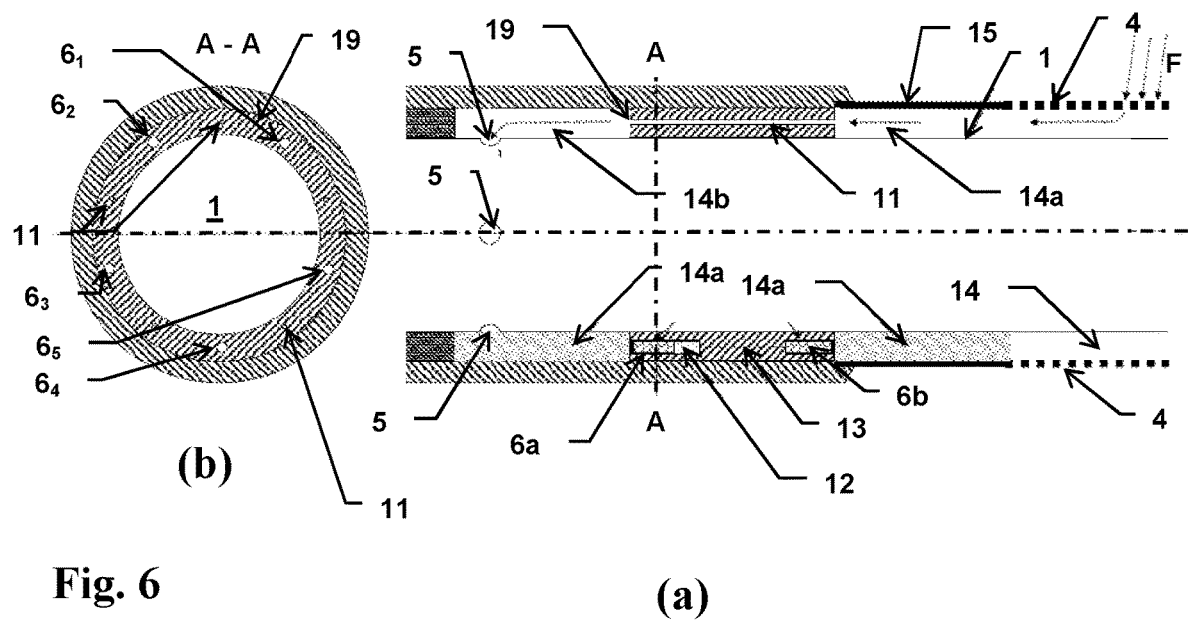

Another embodiment of the invention is illustrated in FIGS. 6a and 6b. FIG. 6a shows produced fluids F flowing into the housing 15 through a sand screen 4. An inflow control device (ICD) 19, having a plurality of through-going nozzles 11 (only one shown in FIG. 6a), is arranged inside the housing, effectively dividing the cavity 14 into a first cavity 14a and a second cavity 14b. The nozzles 11 are designed to equalize zonal flow rates, but will also ensure the desired cavity retention time for the fluid, and thus define a known RTD for the cavity 14 as a whole. A plurality of perforations 5 allow the fluid to flow from the second cavity 14b and into the production liner 1. Also arranged in the ICD 19 are first temperature pulse generators 6a and second temperature pulse generators 6b, interconnected by a synchronization line 13. The synchronization line enables synchronized or simultaneous activation of the first and second temperature pulse generators 6a,b, but activation at different time is also conceivable. Reference number 12 indicates (schematically) a power pack (e.g. a battery) and trigger electronics. FIG. 6a thus illustrates a similar principle of that described above with reference to FIGS. 1-3, namely that the first temperature pulse generator 6a is arranged at a distance from a second temperature pulse generator 6b. In FIG. 6a, the first temperature pulse generator 6a is arranged in thermal connection with the fluid in the second cavity 14b, and the second temperature pulse generator 6b is arranged in thermal connection with the fluid in the first cavity 14a. This ensures a distributed-source (in space) temperature wave, as described above. The resulting temperature wave (response pulse) is sensed by a downstream sensor in same manner as described above with reference to the sensor 2 in FIG. 1.

The above descriptions use the ICD completion setup as an embodiment. It should be noted that the invention is not limited to this, but may also be used for simpler completion setups like predrilled and slotted liners. It should also be noted that although a system having more than two temperature pulse generators would also provide a useful temperature wave (and in fact be closer to an ideal temperature distribution), such plurality of temperature pulse generators is for most cases considered impractical and unnecessary. Generating two temperature inputs is generally sufficient for obtaining the temperature wave described above with reference to FIG. 4.

FIG. 6b shows that the ICD 19 in the illustrated embodiment comprises five sets $6_{1-5}$ of first 6a and second 6b temperature pulse generators. These individual sets may be activated separately, at predetermined or otherwise controlled intervals. For example, one set may be activated every six months, giving the ICD a useful lifespan of 2.5 years. If the temperature pulse generators are powered from an uphole location, in addition to or in lieu of the battery pack 12, the number of times a set might be activated will increase. In general, it should be understood that any of the temperature pulse generators may be controlled by a downhole pre-programmed timer device, pressure signaling from an uphole location, or by signaling or mechanical activation from an intervention string.

As discussed above, a temperature pulse generator may be configured to heat or cool the fluid flowing through the cavity 14. As such, the temperature pulse generator may comprise one or more chemical substances that cause an exothermic reaction (i.e. releasing heat), or an endothermic reaction (in which energy is absorbed from the fluid, causing a temperature drop). The chemical reaction may be caused when chemical substances carried by or within the temperature pulse generator are mixed (before or during ejection into the produced fluids), or/and the chemical reaction may occur between one or more of the chemical substances and the produced fluids. One suitable chemical substance is Thermite, a well-known pyrotechnic composition which undergoes an exothermic reduction-oxidation reaction when ignited by a heat source.

The chemical substance may comprise a tracer material (e.g. an isotopic tracer or chemical tracer) which can be sensed by the downstream sensor(s), and the different tracers may be used in different production zones, whereby responses originating from each zone may be uniquely identified. The chemical substances may comprise liquids, gases, solids, or a combination of these.

Also, the temperature pulse generator may comprise mechanical heating or cooling means, or electrical heating or cooling means. For example, an electrical heater having one or more resistance wires are conceivable, particularly in a configuration in which the heater is powered via an electrical wire from an uphole power source.

Figure 7:
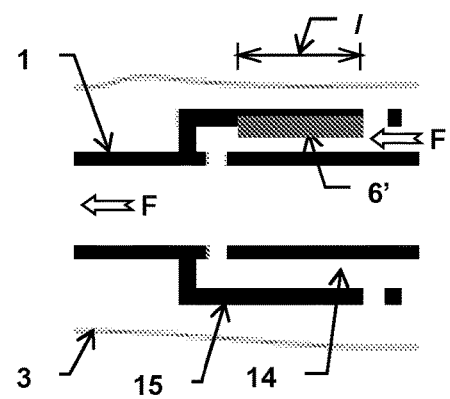
FIG. 7 is similar to FIG. 3, but illustrates another embodiment of the invention.

Turning now to FIG. 7, the temperature inputs discussed above may also be generated by a singular temperature pulse generator 6', as opposed to the pair (or more) of generators described above.

Using only a singular (i.e. one) temperature pulse generator in this manner, the space-distributed temperature inputs may in one embodiment be generated by injecting (e.g. jetting) one or more chemically reactive substances into the fluid, thereby creating a space-distributed temperature pulse in the fluid F.

In another embodiment, the singular temperature pulse generator 6' may comprise one or more heating elements controllable to generate varying input pulses of heat along the length l.

The singular temperature pulse generator 6' may also comprise a resistance wire having a length l, thereby creating a space-distributed temperature pulse in the fluid F.

The term "distributed source" should in this context—using only one temperature pulse generator, mean a source which is capable of generating a spatial temperature input pulse. In one embodiment such generator may have a defined length (l) in the axial direction of the production tubular (i.e. along the flow path for the produced flow), as discussed above, or may comprise means for injecting substances into the wellflow.

The singular temperature pulse generator may thus generate a space-distributed temperature wave, similar to the wave generated by the spatially separated (by the distance d) generators discussed above. The singular temperature pulse generator generates a space-distributed temperature wave by virtue of its extension (l) or by a time-difference between inputs, or a combination of both.

Figure 23:
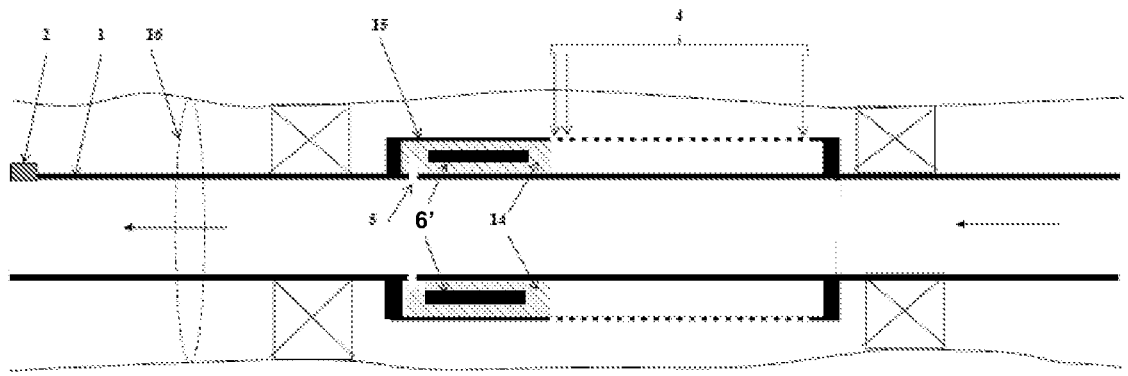
FIG. 23 is a schematic drawing of an embodiment of the invention corresponding to that of FIG. 1.

FIG. 23 corresponds to FIG. 7, as it also illustrates a singular temperature pulse generator 6' arranged in a cavity 14.

Figure 8A:
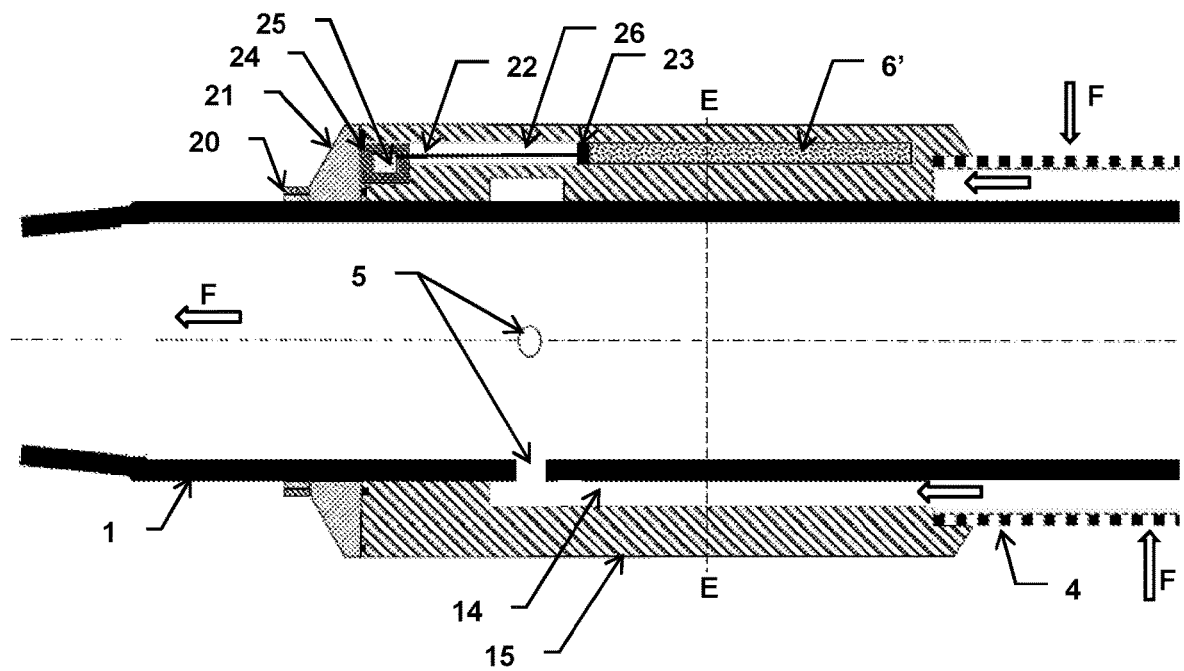
FIG. 8a is a schematic illustration of yet another embodiment of the invention in which heat sources are embedded in pockets in a housing wall.
Figure 8B:
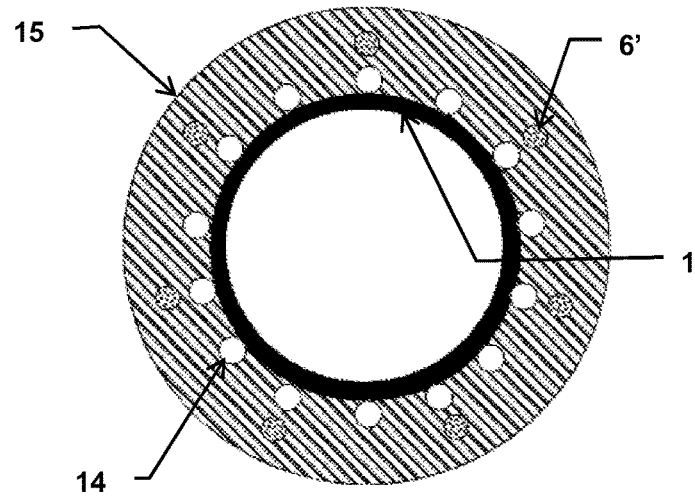
FIG. 8b is a cross-section along the section line E-E in FIG. 8a, and FIG. 8c corresponds to FIG. 8a but illustrates various means by which the heat may enter the flow in the production tubing.

FIGS. 8a and 8b illustrate yet another embodiment of the invention. A cavity 14 is formed between the inner wall of a housing 15 and the outer wall of a production liner 1, and having flow ports in a sand screen 4 and perforations 5 (ports) in the production liner wall, similar to the embodiment described above. In this embodiment, however, the temperature pulse generators 6' are not arranged in immediate contact with the fluid flowing through the cavity 14, but are embedded in respective pockets 26 in the housing wall. FIG. 8b illustrates how a plurality of cavities 14 and temperature pulse generators 6' are arranged circumferentially around the production liner 1. In the illustrated embodiment, the temperature pulse generator 6' comprises a fuze 23, connected via a lead (wire) 22 to an ignitor 25. The ignitor is embedded in thermal insulation 24. To facilitate installation and removal of these components, the housing is furnished with a cap 21 and a lock ring 20.

Figure 8C:
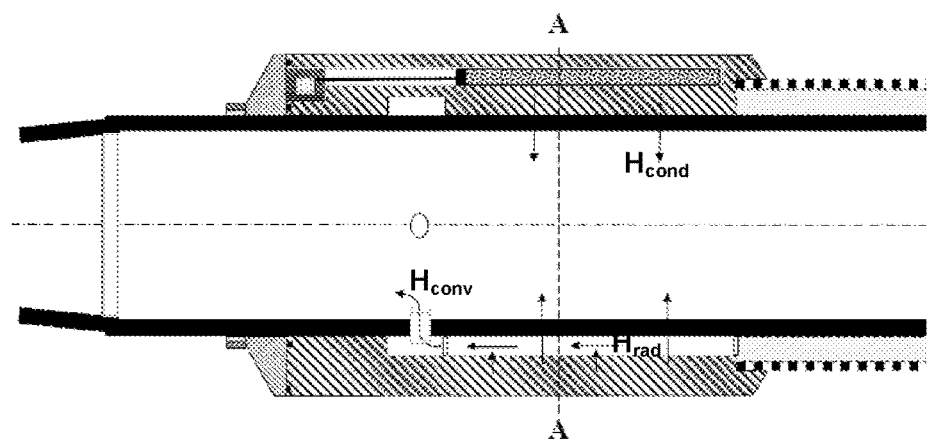

The heat generated by the temperature pulse generator in the embodiment illustrated in FIGS. 8a,b is transferred through the housing wall and to the fluid by means of conduction. However, the heat generated by the temperature pulse generator may also enter the production liner flow by radiation and convection, and convection through the liner wall. This is schematically illustrated in FIG. 8c, where $H_{cond}$ designates conduction, $H_{conv}$ designates convection and $H_{rad}$ designates radiation.

Figure 9:
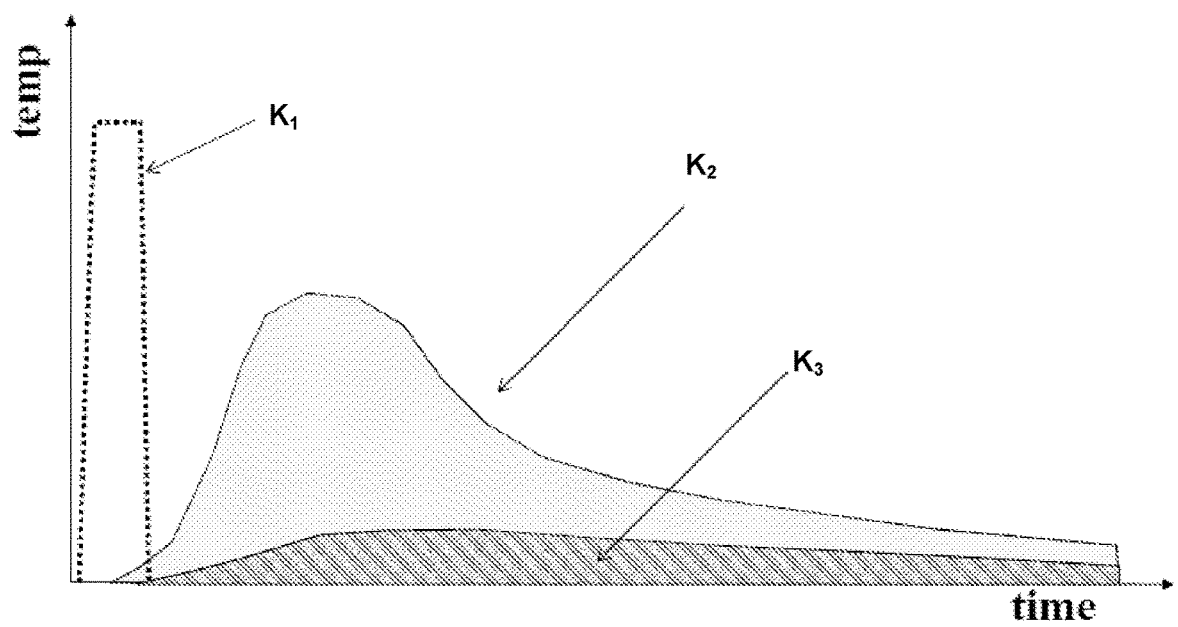
FIG. 9 is a plot showing the heatwave source characterization, i.e. the fluid temperature as a function of time for various heat transfer means, where $K_1$ is the temperature pulse input while $K_2$ is the convection-driven temperature response and $K_3$ is the temperature response from the part of the energy that has propagated through steel wall.
Figure 24:
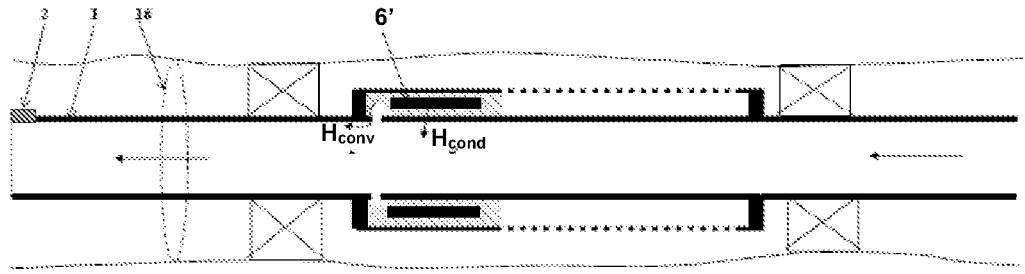
FIG. 24 is a schematic drawing of an embodiment of the invention, illustrating temperature transfer into the fluid.

FIG. 9 illustrates various types of temperature contributions to the production liner flow. The plot designated $K_1$ illustrates the heat pulse generated by the temperature pulse generator. The plot designated $K_2$ illustrates the convection by flow in the flow channels, corresponding to $H_{conv}$ in FIG. 8c. Although there is a small contribution by heat conduction through the materials with which the temperature pulse generator is in contact, the $K_2$ plot is primarily a function of flow (i.e. heat convection in fluids). The plot designated $K_3$ illustrates the conduction through the housing wall (or production tubular wall) only, corresponding to $H_{cond}$ in FIG. 8c. This part of the temperature signal will always be present—regardless of fluid flow—and will indicate the difference between a failed heat source (temperature input generator) and lack of zonal flow. FIG. 24 illustrates a similar principle with a set-up similar to that of FIG. 23.

Figure 10:
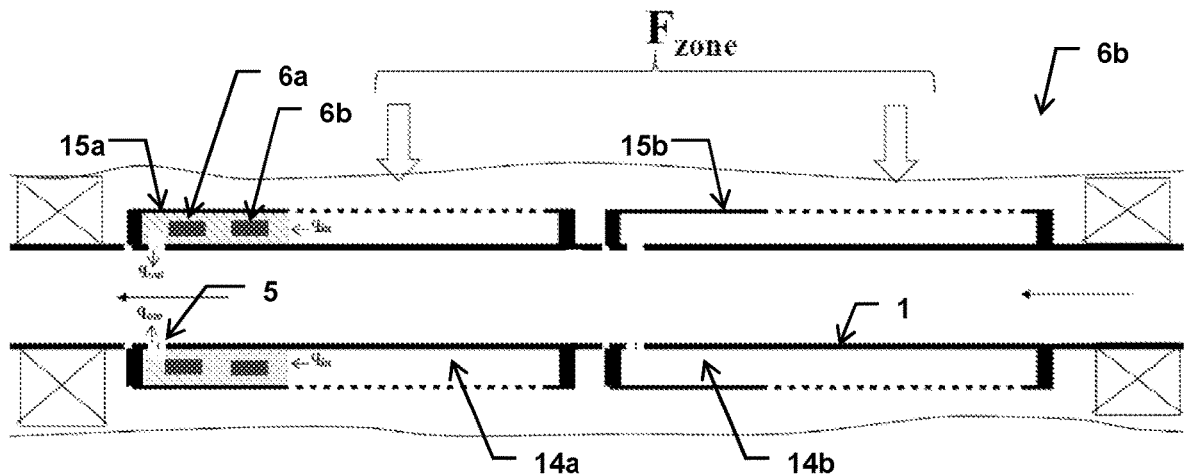
FIG. 10 is a schematic drawing of two completion joints in the same production zone, but in which only one is furnished with spatially distributed temperature pulse input generators. This configuration is used when flow is approximately the same in all joints (one joint represents all). The figure shows a housing with a cavity through which the fluids are flowing. Two temperature pulse generators comprises the distributed temperature input.

Although FIGS. 1 and 2 illustrate one housing (inflow device) per production zone, it should be understood that several housings may be placed in the same zone. FIG. 10 illustrates this embodiment, showing a configuration having two housings 15a, 15b in the same zone. (It should be understood, however, that a similar configuration may be used with embodiments of the invention in which each cavity holds only a singular temperature pulse generators, e.g. as shown in FIG. 7, 8a,b, or 11.) As such, FIG. 10 illustrates a standard sandscreen completion component where production flow $q_{in}$ is guided into the cavities 14a, 14b. In FIG. 10, only one of the cavities comprise temperature pulse generators 6a,b, which is to illustrate the point that the measurement obtained from the first cavity 14a reflects also the flow characteristics through the other cavities within the same zone.

The two (or more) temperature pulse generators can be regarded as two points on a spatially distributed temperature pulse. Such completion components, so-called joints, are widely used and the sectioned part of a wellbore between two packers normally consist of multiple joints. So the zonal production $F_{zone}$ is not necessarily the same as the flow $q_{in}$ through each individual cavity.

Figure 11:
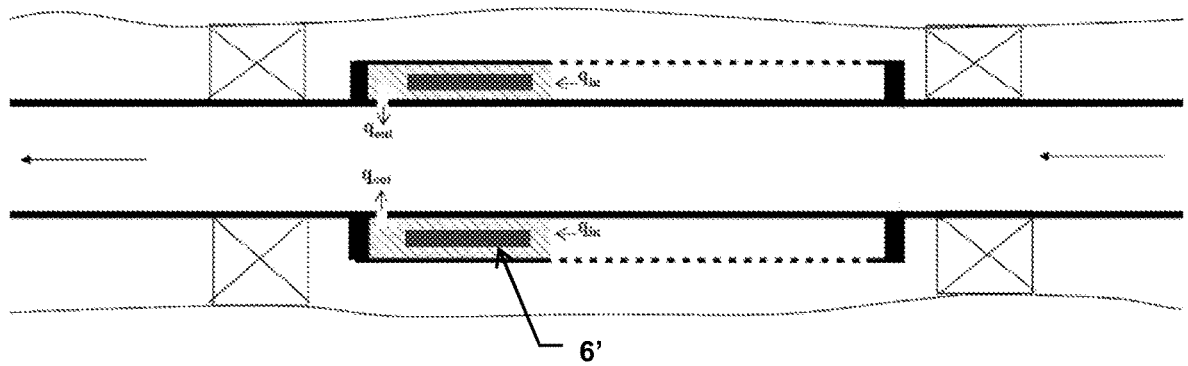
FIG. 11 is a schematic drawing of another embodiment of the invention, in which a singular temperature pulse generator is placed at an end of a cavity.

FIG. 11, which corresponds to FIG. 7, shows an alternative embodiment in which a singular temperature pulse generator 6' gives a spatially distributed temperature change, for example in the same manner as described above with reference to FIG. 7.

Figure 12:
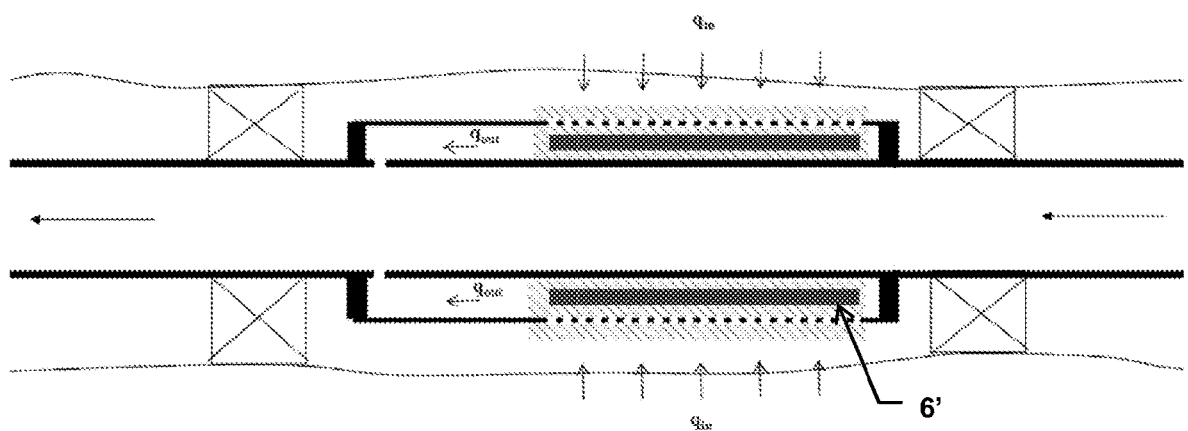
FIG. 12 corresponds to FIG. 11, but illustrates and embodiment in which the temperature pulse generators are arranged in the region of the sand screen.

FIG. 12 shows a similar setup as FIG. 11, but in this embodiment the singular temperature pulse generator 6' is placed along the length of the sand screen. It should be noted that the invention is based on a recognition of the fact that the cavity may not necessarily be have to defined strictly. This is indicated by the hatching in FIG. 12 extending beyond the sandscreen and a short distance into the formation. The skilled person will know that the RTD is based on empirical data.

Figure 13:
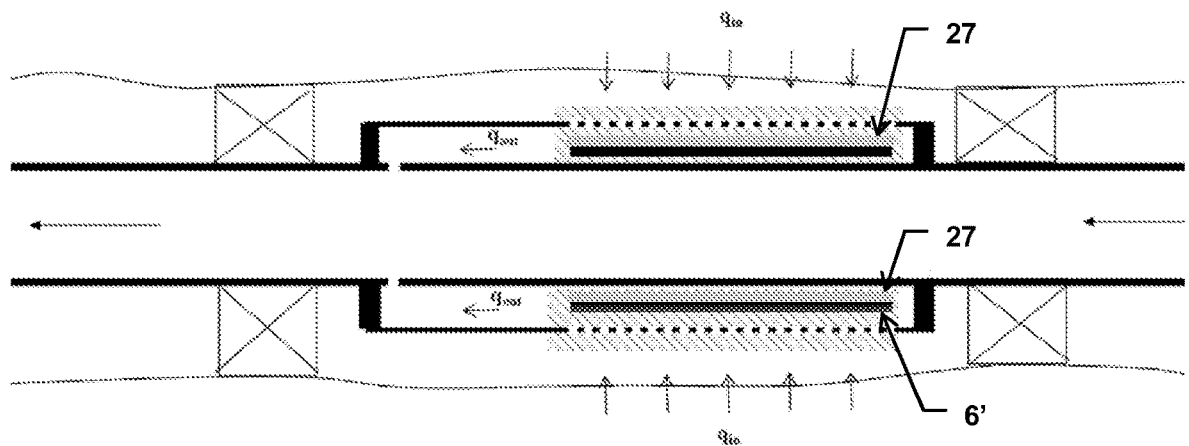
FIG. 13 is a schematic drawing of an embodiment of the invention in which a tracer-carrying polymer rod is arranged together with a respective temperature pulse generator.

FIG. 13 corresponds to FIG. 12, but in this embodiment, a tracer-carrying polymer rod 27 has been arranged along the length of the temperature pulse generator 6'. Tracer technology is used extensively in oil and gas exploration and recovery. Tracers may be injected as pulses in well-to-well studies for measuring flow paths and velocities. Tracer sources may also be placed in oil or gas production wells to monitor inflow from the surrounding formation. For inflow monitoring studies, the tracers may be encapsulated in a polymer which is placed along the external surface of the production tube at different locations before completion of the well, for example as described in U.S. Pat. No. 6,645,769. The tracers can be attached to or encapsulated in polymers or in different types of particles, and the release of the tracers can be made dependent on the type of fluid passing (oil or water), of chemical properties of the fluid (for instance pH or salinity) or for example of temperature.

As with well-to-well studies, the best way of tracer-based monitoring of well flow is by forming tracer pulses. Pulses can be formed by mechanical injections as discussed in U.S. Pat. No. 6,125,934, or pulses may be formed as a result of even tracer release into varying flow rates as described in EP 2,633,152.

The transport and release rates of a penetrating (small-sized) tracer within and out of a given polymer depend on the free volumes within the polymer and on the mobility of the tracer. Factors like saturation, degree of crosslinking, degree of crystallinity, degree of dissolution, etc., will all impact the mobility. However, for a given combination of penetrating tracer and a polymer and a given physical state, the mobility within and out of the polymer will tend to act as a thermally activated process.

So many tracer-carrying polymers will respond to temperature, which is a stimulant that may be applied by the temperature pulse generator 6' as illustrated in FIG. 13. In the illustrated embodiment, wherein the tracer-carrying polymer rod 27 is arranged along the length of, and in thermal contact with, the temperature pulse generator 6', mobile tracer molecules are able to diffuse through the polymer material and be released into any liquid (or gas) in contact with the polymer. A requirement, however, is that there is some affinity to the surrounding liquids. Combining the two properties that 1) tracer release is a function of temperature, and 2) tracer release is a function of affinity to surrounding liquids, leads to the idea of creating intelligently released tracer pulses by temperature stimuli.

Figure 14:
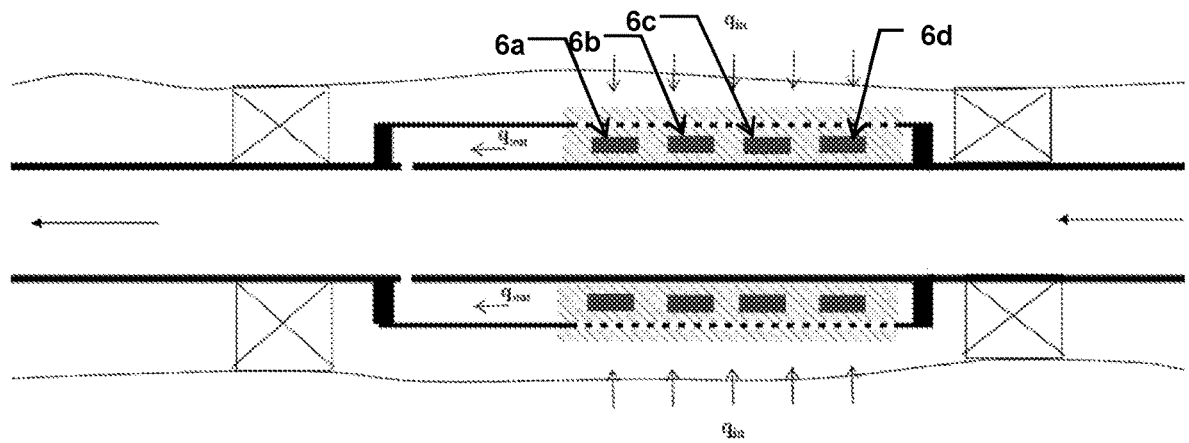
FIG. 14 is a schematic drawing illustrating a plurality of temperature pulse generators arranged inside a cavity, in a region of the sand screen.

FIG. 14 shows similar setup as FIG. 12, but now with multiple temperature pulse generators 6a-d. Note that as the number of temperature pulse generators increases, the total generated temperature pulse will approach that of a spatially distributed singular temperature pulse generator.

FIGS. 10 to 14 all illustrate embodiments suitable for completion joints where all flow is guided towards one production entry location, a cross-section with one or more perforations 5 towards the production liner (or tubing) 1.

Figure 15:
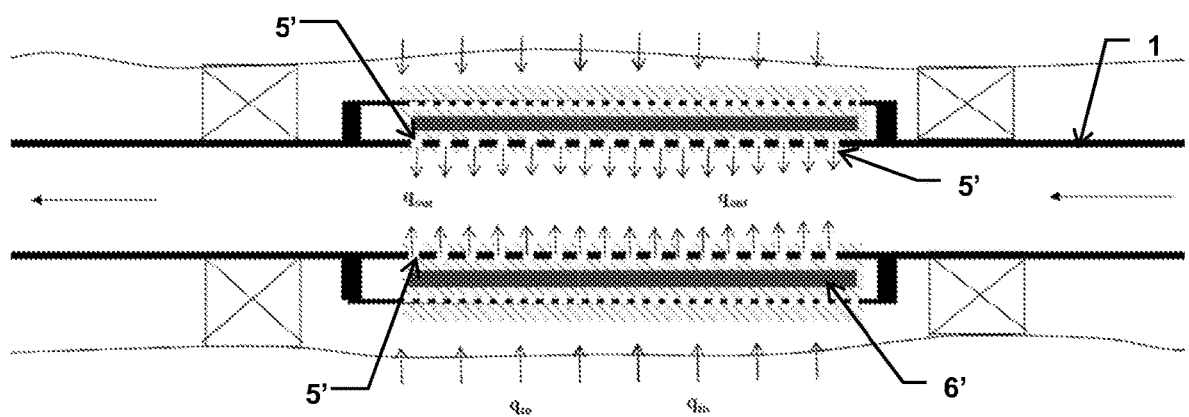
FIG. 15 is a schematic drawing of singular temperature pulse generators arranged in a cavity on a slotted liner.

Such completions are widely used where it is desirable to use inflow control devices (ICDs, Sliding Sleeves, etc). Optionally, the production liner 1 may have several perforations 5' along the cavity length, as shown in FIG. 15. Such configurations are normally referred to as Predrilled or Slotted liners. In the illustrated embodiment of the invention, the end ring arrangement with the entry perforations is shorter than normal (or omitted) and a temperature pulse generator 6' runs along the joint (liner) while the completion cavity 14d is defined with diffuse boundaries, corresponding to the cavity configuration described above with reference to FIG. 12. This configuration, with multiple perforations 5' in the liner, is associated with shorter RTDs than the configurations described above with reference to FIGS. 10 to 14. It should be noted that the embodiments having multiple temperature pulse generators (described above) may also be used with the predrilled or slotted liner configuration.

Figure 16:
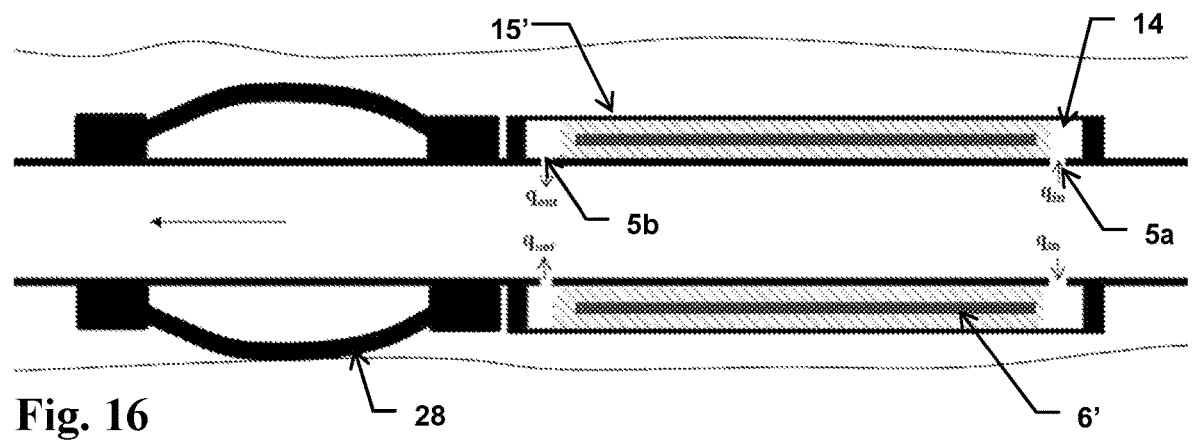
FIG. 16 is a schematic drawing of another embodiment of the invention, in which the cavity, with singular temperature pulse generator, is arranged so as to function as a flow shunt for a production liner, for example a cemented liner.
Figure 17:
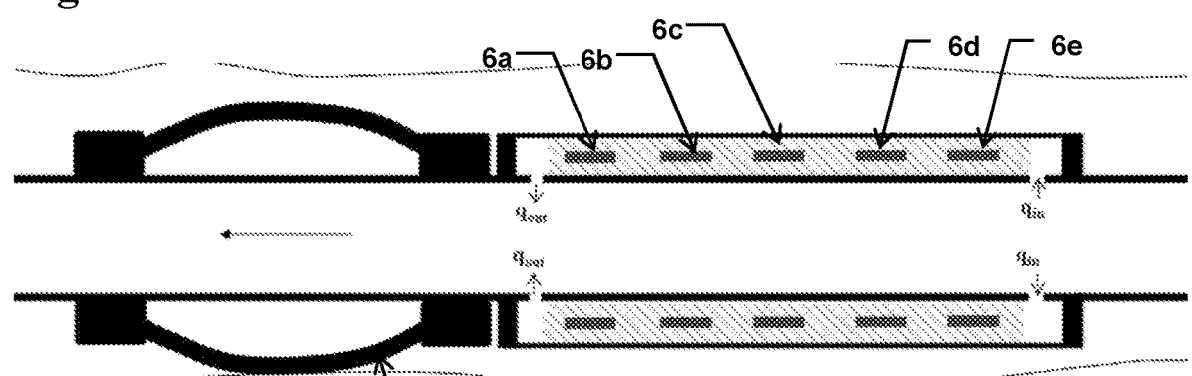
FIG. 17 corresponds to FIG. 16, but shows an embodiment having multiple temperature pulse generators.

FIG. 16 shows an embodiment in which the housing 15' is arranged on the outside of the production liner, as described above. In this embodiment. however, the cavity 14 is closed against the formation surrounding the production liner, but the liner wall comprises first and second perforations 5a, 5b (for inflow and outflow). A singular temperature pulse generator 6' is arranged in the cavity 14. This embodiment therefore in effect provides a shunt on the outside of a production tubing 1, allowing a portion of fluid in the liner for flow into ($q_{in}$) and out of ($q_{out}$) the volume 14. FIG. 17 corresponds to FIG. 16, but illustrates a variant having multiple temperature pulse generators 6a-e. FIGS. 16 and 17 also show a centralizer unit 28 between the liner and the formation. Such centralizer unit is normally preferred when the liner initially is a long blank section without (centralizing) packers. It should be understood that the configurations illustrated in FIGS. 16 and 17 are suitable in situations where the liners are cemented in the wellbore.

Figure 18:
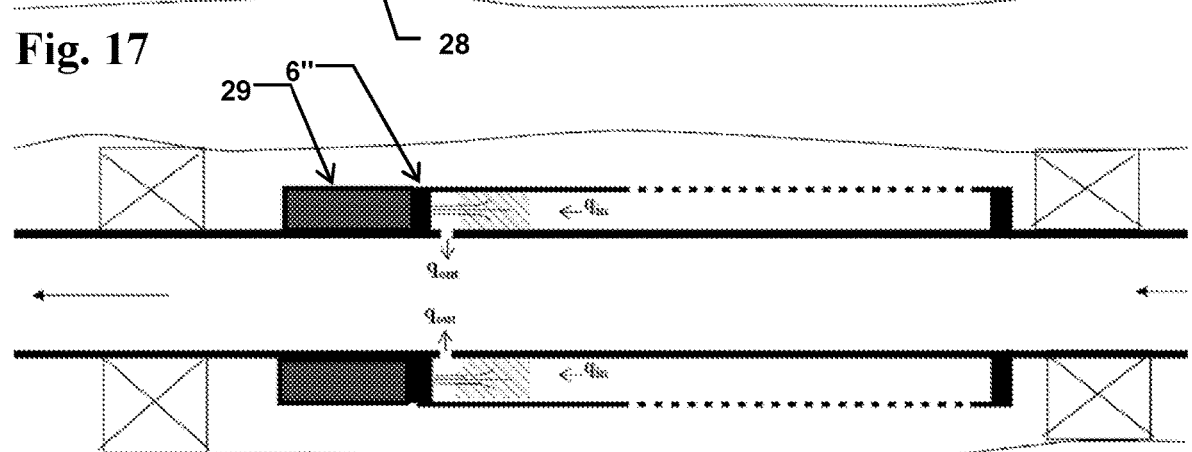
FIG. 18 is a schematic drawing showing an embodiment in which the temperature pulse generators comprise heated fluid jets, arranged to inject heated fluid into the cavity.

FIG. 18 shows a setup that is similar to FIGS. 10 and 11. However, in this embodiment, the temperature pulse generators comprise heat injectors 6" configured to inject heated fluids from a reservoir 29 into the cavity 14, where the fluids of different-temperatures are mixed.

Figure 19:
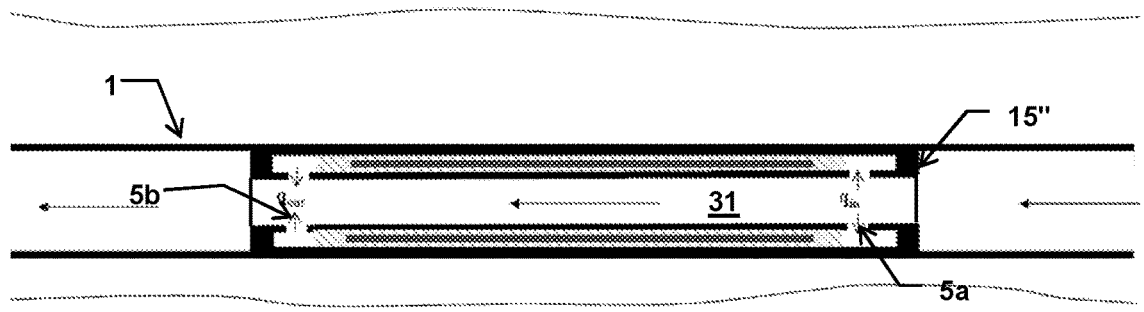
FIG. 19 is a schematic drawing of another embodiment of the invention, comprising a liner-internal unit arranged inside a production liner.
Figure 20:
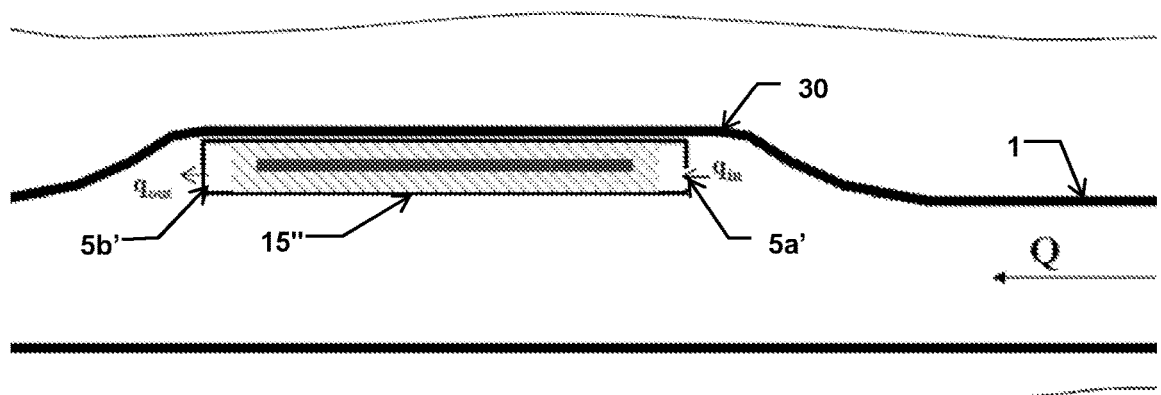
FIG. 20 is a schematic drawing of another embodiment of the invention, comprising a liner-internal unit arranged in a side-pocket in a production liner.
Figure 21:
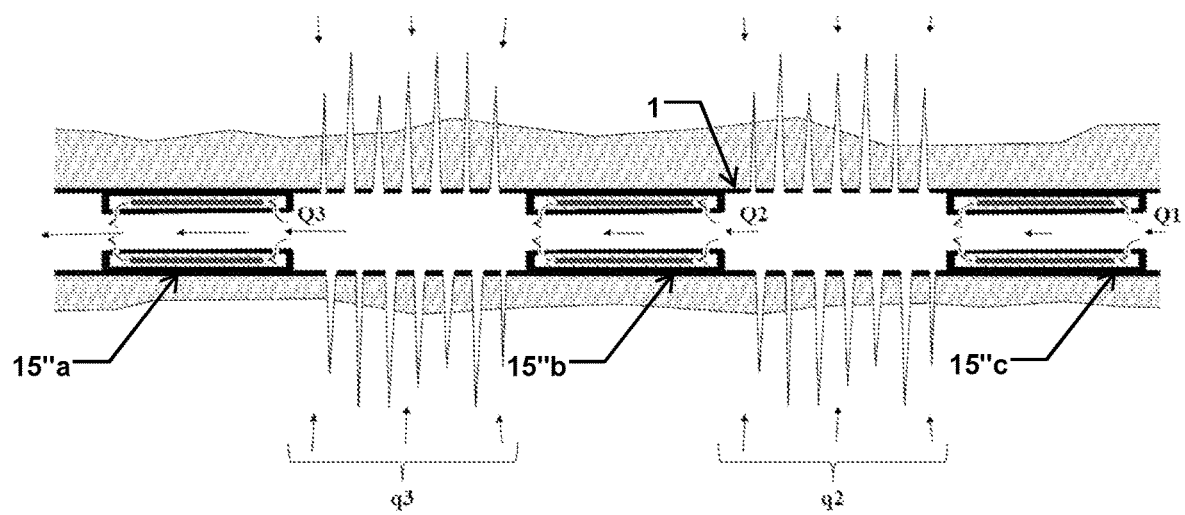
FIG. 21 is a schematic drawing illustrating the use of several line-internal units, as shown in FIG. 19, arranged in a cemented liner, in order to perform inflow profiling.

FIGS. 19, 20 and 21 illustrate another embodiment of the invention, comprising an insert housing 15", for installation inside the production tubular 1. FIG. 19 illustrates an insert housing 15" arranged in the production liner 1 and having radially oriented inflow and outflow ports 5a,b at opposite ends of the housing. The insert housing 15" is configured to fit inside the tubular 1 and comprises a through-going bore 31, and the inflow and outflow ports 5a,b are in fluid communication with the bore 31.

FIG. 20 illustrates an insert housing 15" arranged in a side pocket 30 in the production liner 1 and having axially oriented inflow and outflow ports 5a', 5b'. FIG. 21 shows how several insert housings 15"a-c can be arranged at various locations in the liner (or casing) to determine inflow profiles at various positions in the wellbore (production zone).

Figure 22:
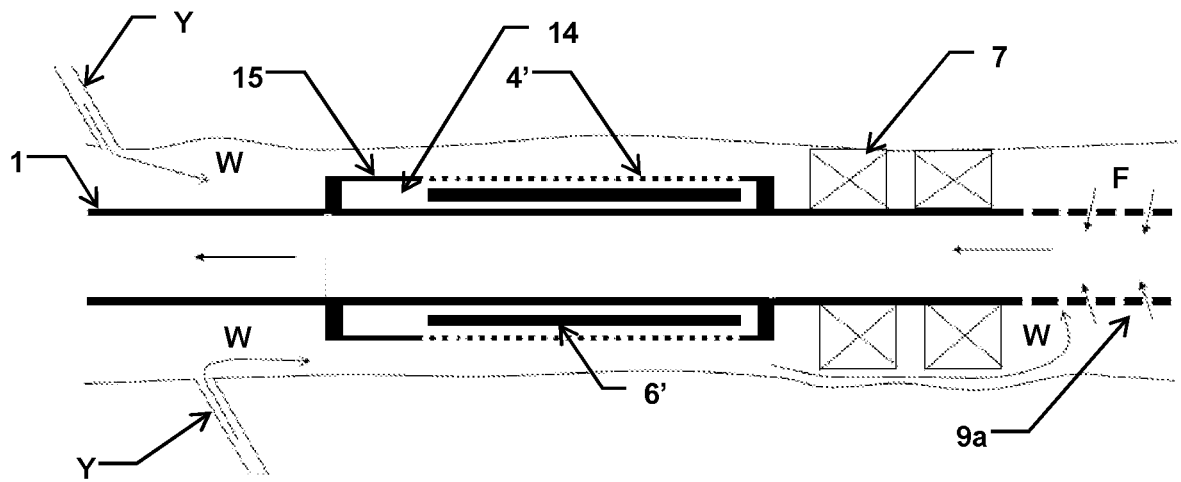
FIG. 22 is a schematic drawing, illustrating an embodiment of the invention, used in a situation in which a fracture has been discovered during drilling, and the unwanted flow from the fracture is blocked from the production zone by packers. If convection-driven temperature pulses are detected, it is a sign of packer leak.

FIG. 22 illustrates a situation in which a fracture Y in the formation has been discovered during drilling. The fracture Y is outside the production zone 9a (hydrocarbon reservoir) and has a potential for producing water. A blank completion (production tubular 1) is set across the fracture and fitted with packers 7 to block off any water flowing annularly into the producing zone. An external housing 15, having one or more temperature pulse generators 6', has been installed on the tubular to detect any unwanted leakage (e.g. water W) across the packers 7. In this embodiment there are no perforations in the tubular (i.e. fluid outlets 5, discussed above); the only fluid path into the housing cavity 14 is through the inlet ports 4. When using this embodiment of the invention, the temperature input (most commonly: heat) generated by the one or more temperature pulse generators 6' will be conducted through the production tubular wall (e.g. steel wall) and generate a space-distributed heatwave in the produced flow, as described above. If no water flows into the cavity 14, the only heat entering the produced flow is that which is transferred via conduction through the tubular wall, corresponding to plot $K_3$ in FIG. 9 (discussed above). If water W enters the cavity 14, the generated heat will in addition be transferred by means of convection, corresponding to plot $K_2$ in FIG. 9 above. The embodiment of the invention illustrated on FIG. 22 may thus be used to detect water influx as such, and not to monitor well flow as in the embodiments described above. It should be understood that this detection functionality may also be accomplished with the embodiments described above with reference to e.g. FIGS. 1, 6, 7, 8a.

Figure 25:
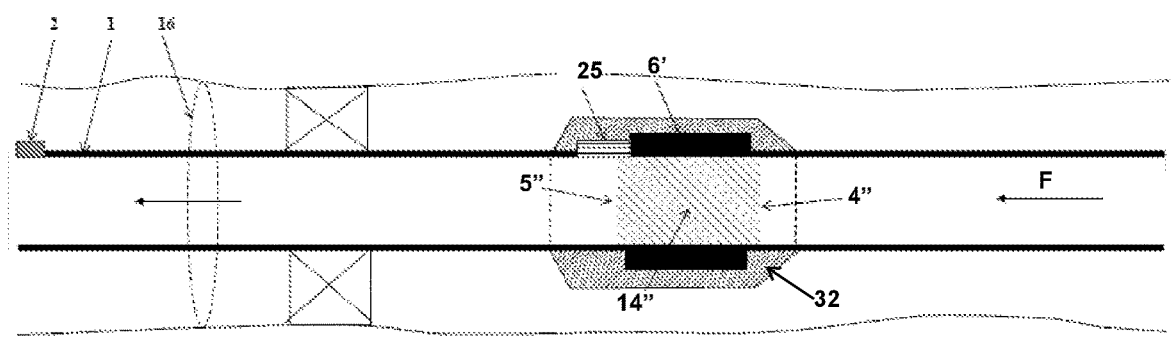
FIG. 25 is a schematic drawing of yet another embodiment of the invention, in which a temperature pulse generator is assembled on the outside of a production liner or casing. An effective cavity is then formed in a length of the tubing inside (having a short RTD), while the temperature input is the part of the generator energy that has propagated through the steel wall.

A further embodiment of the invention is illustrated in FIG. 25, where a temperature so pulse generator 6'" has been installed onto the production liner 1, i.e. in direct thermal contact with the liner wall. A cover (housing) 32 is arranged around the temperature pulse generator 6'", enclosing also an ignitor unit 25. In this embodiment, the temperature input pulse emitted from the temperature pulse generator 6'" is conducted through the liner wall (i.e. steel wall) and into the fluid F flowing through the liner. In contrast to the embodiments described above, in which a housing defines a cavity separated from the flow inside the liner, the embodiment illustrated in FIG. 25 the volume ($V_c$) which is subjected to the temperature input pulse (or pulses) is the portion of the liner which is adjacent to the temperature pulse generator 6'". The extent (i.e. the effective volume $V_c$) of this "effective" cavity 14'" is of course dependent on the temperature input power and the fluid flow rate inside the liner. Reference number 4'" denotes an "effective" fluid inlet and 5'" and "effective" fluid outlet. It should be understood that the RTD of the effective cavity 14'" will depend mainly on the fluid flow rate (q) through the cavity (and hence the volume $V_c$). While this embodiment may be unsuitable for producing quantitative measurements (due the small difference in RTD between the effective volume and the volume of the liner as such), in may nonetheless be useful as an indicator of whether or not fluid flow is present in the liner.

A further aspect of the invention, and as such applicable to any of the embodiments described above, is that when temperature input (by one or more of two temperature pulse generators) is provided in the form of one or more heat input pulses into the fluid flowing through the cavity 14, gas entrained in the fluid will expand; to an extent determined by the added energy. In certain circumstances, if the temperature increase is sufficiently high, liquid fluid components may change phase (evaporate) and form gas in the fluid. In addition, the chemical reactions described above may generate various gases that will affect the fluid flow. These generated gases will depend on the chemical substances used. The principle of gas formation and/or expansion in produced fluids are well known in the art, and has been utilized extensively for decades in so-called "gas lift" systems; i.e. to displace fluids (including mud) and enhance production in a wellbore.

The invented system may be used as a "displacement generator"; effectively a gas lift system, by operating the temperature pulse generators in the various production zones in a selective and controlled manner to stimulate production or to provide an initial "kick" in a stagnant flow. Monitoring the respective temperature waves (at the downstream sensor 2) will provide an indication of that the zone in fact is producing (i.e. produced fluid flow is present in the respective cavity). Tracer materials (e.g. isotopic tracers), as described above, may also be used for this purpose.

In other situations, the gas formation and/expansion described above is an unwanted effect of the heating input. This effect can be mitigated by operating two sets of temperature pulse generators in successive heating and cooling sequences. For example, a heat input by a first temperature pulse generator set 6a,b may be succeeded by a cooling input by the second temperature pulse generator set 6a,b.

In the multiphase case it may be of interest to send message to surface about events like water and gas breakthroughs. There are, especially for water, simple monitoring methods like resistivity sensors that may more or less directly indicate if water is present (in contrast to oil and gas).

The invention claimed is:

1. A method of monitoring fluid flow in a wellbore, comprising:
    inducing one or more space-distributed temperature input pulses via a temperature pulse generator in at least a portion of a fluid in a housing in the wellbore and having at least one cavity and one or more flow ports;
    sensing a temperature response pulse caused by said temperature input pulses, at one or more locations downstream of said cavity; and
    determining a flow rate of said fluid through said cavity based on one or more characteristics of said temperature response pulse, and a Retention Time Distribution (RTD) of said cavity.

2. The method of claim 1, wherein said characteristics are one or more of amplitude, decay, width, and area under a temperature response curve defined by the temperature response pulse.

3. The method of claim 1, wherein a temperature input pulse comprises a heat input or a cooling input.

4. The method of claim 3, wherein the heat input comprises an exothermic process and the cooling input comprises an endothermic process.

5. The method of claim 1, wherein a temperature input pulse comprises an injection of a chemical substance into the fluid.

6. The method of claim 5, wherein the temperature input pulse comprises a tracer material.

7. The method of claim 1, wherein a temperature input pulse is configured to contribute to a phase change in the fluid.

8. The method of claim 1, wherein a temperature input pulse is configured to mitigate volume expansion in the fluid.

9. The method of claim 1, wherein a temperature input pulse is controlled by a downhole pre-programmed timer device or by pressure signaling from an uphole location, or by signaling or mechanical activation from an intervention string.

10. The method of claim 1, wherein the temperature pulse generator comprises one or more sensors that detect a presence of fluid phases of at least one of water, oil, or natural gas, and modulates information related to fluid phase presence onto a shape of the temperature input pulse.

11. The method of claim 10, wherein at least one of the one or more sensors is a downhole temperature sensor.

12. The method of claim 1, wherein the cavity is defined by a housing having at least an inflow opening and an outflow opening.

13. The method of claim 12, wherein at least a first opening is between the cavity and a subterranean formation, and at least a second opening is between the cavity an interior of a lower completion tubular extending in the wellbore.

14. The method of claim 13, wherein the tubular is a production liner.

15. The method of claim 1, wherein the temperature input pulse is a heat input, at least a portion of which is conveyed to a tracer member and causing a tracer pulse to be released.

16. The method of claim 15, further comprising sampling of at least a portion of produced liquids at a location downstream of the location of said temperature input, to determine tracer content in said samples.

17. The method of claim 15, further comprising inline and real-time sensing of tracer content in at least a portion of produced liquids at a location downstream of the location of said temperature input pulse.

18. The method of any one of claims 15-17, wherein the flow rate is determined based on one or more characteristics of said tracer pulse, and the Retention Time Distribution (RTD) of said cavity.

19. The method of claim 18, wherein said characteristics of said tracer pulse are one or more of amplitude, decay, width, and area under a temperature-response curve defined by the tracer pulse.

20. A system for monitoring fluid flow in a wellbore (16), comprising:
    one or more temperature pulse generators arranged in a cavity in a housing having a fluid inlet and a fluid outlet in fluid connection with the cavity;
    the housing being arranged in the wellbore;
    said one or more pulse generators being configured to induce one or more space-distributed temperature input pulses to the fluid;
    one or more sensors arranged at a location downstream of said cavity; said sensor being configured to sense at least a temperature response pulse caused by said temperature input pulses; and
    computing means configured to determine a flow rate of said fluid based on one or more characteristics of said temperature response pulse, and a Retention Time Distribution (RTD) of said cavity.

21. The system of claim 20, wherein the temperature pulse generators comprise at least a first temperature pulse generator and a second temperature pulse generator, arranged with a distance apart.

22. The system of claim 20, wherein the temperature pulse generators comprise at least a single temperature pulse generator having a length dimension.

23. The system of claim 20, wherein a temperature pulse generator comprises a heater element or a cooling element.

24. The system of claim 20, wherein a temperature pulse generator comprises a chemical substance or an electrical heater.

25. The system of claim 20, wherein a temperature pulse generator is powered and controlled via control lines from an uphole location.

26. The system of claim 20, wherein a temperature pulse generator is powered and controlled by a downhole power and control module.

27. The system of claim 20, wherein a temperature pulse generator is powered and controlled by signaling or mechanical activation from an intervention string.

28. The system of claim 20, wherein said one or more sensors comprise real-time downstream sensors for other parameters.

29. The system of claim 20, wherein the cavity is defined by an inner wall of the housing and a portion of an outer wall of a lower completion tubular extending in the wellbore.

30. The system of claim 29, wherein the one or more sensors are arranged in said lower completion tubular, in fluid communication with the fluid.

31. The system of any one of claims 29-30, wherein the lower completion tubular is a production liner or a casing.

32. The system of claim 20, wherein the housing is configured for installation inside a lower completion tubular and comprises an annular bore, and inflow and outflow ports in fluid communication with the bore.

* * * * *

UNITED STATES PATENT AND TRADEMARK OFFICE
CERTIFICATE OF CORRECTION

PATENT NO. : 10,697,291 B2
APPLICATION NO. : 15/999091
DATED : June 30, 2020
INVENTOR(S) : Fridtjof Nyhavn, Erik Iversen Nakken and Jean-Christophe Barbier It is certified that error appears in the above-identified patent and that said Letters Patent is hereby corrected as shown below:

In the Claims

Column 16, Line 6 in Claim 13, "and at least a second opening is between the cavity an", should read -- and at least a second opening is between the cavity and an --

Signed and Sealed this
Third Day of November, 2020

Andrei Iancu
*Director of the United States Patent and Trademark Office*